United States Patent Office 3,231,615
Patented Jan. 25, 1966

3,231,615
TETRACHLORO-ORTHO-PHENYLENEDIAMINE
AND SALTS THEREOF
Peter Lawrence Carter, Bishop's Stortford, Edwin Dawson Chilwell, Saffron Walden, David William John Lane, Barton, and Geoffrey Tattersall Newbold, Saffron Walden, England, assignors to Fisons Pest Control Limited, Harston, Cambridgeshire, England, a British company
No Drawing. Filed Aug. 13, 1962, Ser. No. 216,334
Claims priority, application Great Britain, Aug. 19, 1961, 30,002/61
4 Claims. (Cl. 260—578)

The present invention relates to improved fungicidal compositions and to the new compound tetrachloro-ortho-phenylenediamine.

It has been found that tetrachloro-ortho-phenylenediamine possesses high fungicidal activity, particularly against rusts.

The present invention is for the new compound tetrachloro-ortho-phenylenediamine and salts thereof.

The present invention is also for a fungicidal composition which contains as an active ingredient tetra-chloro-ortho-phenylenediamine or a salt thereof.

The fungicidal compositions according to the present invention may also contain one or more of the materials selected from the group comprising surface active agents and solid diluents.

The present invention is also for a process for the treatment of plants and articles which comprises treating the plants or articles with a fungicidal composition containing as an active ingredient tetrachloro-ortho-phenylenediamine or a salt thereof.

In accordance with one embodiment of the invention the tetrachloro-ortho-phenylenediamine is prepared by the reduction of tetrachlorobenzotriazole.

Tetrachloro-ortho-phenylenediamine forms salts with strong acids such as hydrochloric acid, sulphuric acid and trichloroacetic acid, and the tetrachloro-ortho-phenylenediamine may be used in this form.

Tetrachloro-ortho-phenylenediamine is rather insoluble in water, and may be incorporated in fungicidal compositions in any of the ways commonly adopted for the formulation of insoluble fungicides. Thus for example tetrachloro-ortho-phenylenediamine may be incorporated into an aqueous suspension with or without wetting agents or into an emulsion and/or mixed with solid inert diluents.

Alternatively the fungicidal composition may be formed by dissolving the tetrachloro-ortho-phenylenediamine in a water immiscible solvent such as for example a high boiling aromatic hydrocarbon containing dissolved emulsifying agents so as to act as a self-emulsifiable oil on addition to water.

Similarly the fungicidal composition may be formed by dissolving the tetrachloro-ortho-phenylenediamine or salt thereof in an organic solvent, such as for example methyl Cellosolve or ethanol, and the resulting solution used as such or dispersed in water with or without the assistance of a wetting agent. Alternatively the tetrachloro-ortho-phenylenediamine or salt thereof may be admixed with a wetting agent or a non-solvent diluent to be used as such or to form a product which is dispersible in water. The tetrachloro-ortho-phenylenediamine or salt thereof may also be mixed with a wetting agent, with or without the incorporation of powdered or divided solid materials as referred to above, so that a wettable product is obtained which is capable of use as such or as a suspension or dispersion in water.

The tetrachloro-ortho-phenylenediamine or salt thereof may be incorporated for example with solid inert media comprising powdered or divided solid materials, for example clays, sands, talc, mica, fertilizers and the like, such products either comprising dust or larger particle size material.

The tetrachloro-ortho-phenylenediamine or salt thereof may be incorporated for example with solid inert media comprising powdered or divided solid materials, as referred to above, together with a wetting agent, so that a wettable product is obtained which is capable of use as such or as a suspension or dispersion in water.

The wetting agents used may comprise anionic compounds such as for example soaps, fatty sulphate esters such as dodecyl sodium sulphate, fatty aromatic sulphonates such as alkylbenzene-sulphonates or butyl naphthalene sulphates, more complex fatty sulphonates such as the amide condensation product or oleic acid and N-methyl taurine or sodium sulphonate of dioctyl succinic acid. The wetting agents may also comprise nonionic agents such as for example condensation products of fatty acids, fatty alcohols or fatty substituted phenols with ethylene oxide, or fatty esters and ethers of sugar or polyhydric alcohols, or the products obtained from the latter by condensation with ethylene oxide, or the products known as block copolymers of ethylene oxide and propylene oxide. The wetting agents may also comprise cationic agents such as for example cetyl trimethylammonium bromide and the like.

If desired the fungicidal compositions according to the present invention may contain in addition to the tetrachloro-ortho-phenylenediamine or salt thereof other agricultural chemicals such as herbicides, fungicides, pesticides, plant growth regulants and the like. According to one embodiment of the invention the tetrachloro-ortho-phenylenediamine or salt thereof is mixed with other fungicides such as for example sulphur, copper compounds such as cuprous oxide or copper oxychloride, nickel compounds such as nickel hydroxide or organic fungicides such as tetramethyl-thiuram disulphide.

The following examples are given to illustrate the present invention. The parts and percentages quoted are by weight unless otherwise indicated.

Example 1

To a mixture of 100 parts of 4,5,6,7-tetrachlorobenzotriazole and 100 parts of zinc powder in 500 parts of refluxing ethyl alcohol, was added 250 parts of concentrated hydrochloric acid over a period of one hour. The solution thus obtained was filtered, diluted with water and made strongly alkaline with sodium hydroxide. The precipitated tetrachloro-ortho-phenylenediamine was filtered off and recrystallized from aqueous ethanol to give needles of melting point 234–235° C. in a 65% yield.

*Analysis.*—Theory: C, 29.30; H, 1.64; Cl, 57.67; N, 11.39%. Found: C, 29.30; H, 1.75; Cl, 58.00; N, 11.50%.

Example 2

Tetrachloro-ortho-phenylenediamine was incorporated in the nutrient medium known as potato-dextrose-agar medium in a wide range of concentrations and the medium filled into culture plates. The cooled culture plates were inoculated with mycelial plugs of parasitic fungi and observations made as to the concentration in parts per million (p.p.m.) of tetrachloro-ortho-phenylenediamine required (a) to reduce the rate of growth of the fungi to 50% of the controls, and (b) to reduce the rate of growth to 5% of the controls.

The results obtained are given below.

| Concentration in p.p.m. required to reduce rate of growth to: | Phytophthora palmivora | Alternaria solani | Botrytis fabae | Fusarium oxysporum | Verticillium alboatrum | Fomes annosus |
|---|---|---|---|---|---|---|
| (a) 50% | 17 | <10 | <10 | <10 | about 10 | <10 |
| (b) 5% | 80 | 80 | 19 | 300 | 1,000 | <10 |

*Example 3*

Tetrachloro-ortho-phenylenediamine in solution in 50% aqueous acetone was sprayed onto the foliage of tomato (*Lycopersicum esculentum*), field bean (*Vicia faba*), cucumber (*Cucumis sativus*) and French bean (*Phaseoleus vulgaris*) and the foliage was subsequently inoculated with spores of *Alternaria solani, Botrytis fabae, Erysiphe cichoracearum* and *Uromyces fasciola* respectively. Control of the growth of *Alternaria solani* was negligible, and control of the growth of *Botrytis fabae* was moderate. Excellent control was obtained of the growth of *Erysiphe cichoracearum* and *Uromyces fasciola*.

In a further series of experiments with French beans half of each leaf of each plant was mechanically covered so that when the plants were sprayed with a suspension of tetrachloro-ortho-phenylenediamine, the spray deposit was obtained on half of the leaf only. Twenty-four hours after the spray treatment, the whole of the leaves were inoculated with *Uromyces fasciola*. Control of the growth of the *Uromyces fasciola* was obtained on both halves of the treated leaves, showing that the tetrachloro-ortho-phenylenediamine acts systemically.

*Example 4*

50 parts of tetrachloro-ortho-phenylenediamine were ground with 200 parts of kaolin and 20 parts of dodecyl sodium sulphate. The resulting powder could be suspended in water at various concentrations for spraying.

We claim:
1. A compound selected from the group consisting of tetrachloro-ortho-phenylenediamine, tetrachloro-ortho-phenylenediamine hydrochloride, tetrachloro-ortho-phenylenediamine sulfate, and tetrachloro-ortho-phenylenediamine trichloro acetate.
2. Tetrachloro-ortho-phenylenediamine.
3. Tetrachloro-ortho-phenylenediamine hydrochloride.
4. Tetrachloro-ortho-phenylenediamine sulfate.

References Cited by the Examiner

UNITED STATES PATENTS

| | | | |
|---|---|---|---|
| 2,876,230 | 3/1959 | Folkers et al. | |
| 2,923,657 | 2/1960 | Dost et al. | 167—30 |
| 2,927,053 | 3/1960 | Eden | 167—30 |
| 2,983,758 | 5/1961 | Hoover | 260—578 |
| 3,068,289 | 12/1962 | Woodbridge | 260—578 |

OTHER REFERENCES

Adams et al.: Journal of American Chemical Society, vol. 74, pages 3029–32.

CHARLES B. PARKER, *Primary Examiner.*

JULIAN S. LEVITT, *Examiner*